United States Patent [19]
Gumbmann, Jr.

[11] Patent Number: 4,648,555
[45] Date of Patent: Mar. 10, 1987

[54] IRRIGATION DEVICE

[76] Inventor: Joseph Gumbmann, Jr., P.O. Drawer G, Burney, Calif. 96013

[21] Appl. No.: 798,877

[22] Filed: Nov. 18, 1985

[51] Int. Cl.⁴ .............................................. B05B 12/12
[52] U.S. Cl. ........................................ 239/63; 73/337; 137/78.3
[58] Field of Search ............... 239/63, 67; 73/73, 337; 236/44 A, 337.5; 137/78, 78.3

[56] References Cited

U.S. PATENT DOCUMENTS

| | | | |
|---|---|---|---|
| 2,674,490 | 4/1954 | Richards | 299/25 |
| 2,768,027 | 10/1956 | Nelson | 239/63 |
| 3,204,872 | 9/1965 | Whear | 239/63 |
| 3,874,590 | 4/1975 | Gibson | 239/63 |
| 4,095,458 | 6/1978 | Wild | 239/63 |
| 4,214,701 | 7/1980 | Beckmann | 239/63 |

Primary Examiner—Andres Kashnikow
Assistant Examiner—Michael J. Forman
Attorney, Agent, or Firm—Leonard D. Schappert

[57] ABSTRACT

An irrigation device for controlling moisture level in soil utilizing a moisture-sensitive element which mechanically actuates a valve so that availability of water is controlled by the presence or absence or moisture in the soil.

4 Claims, 4 Drawing Figures

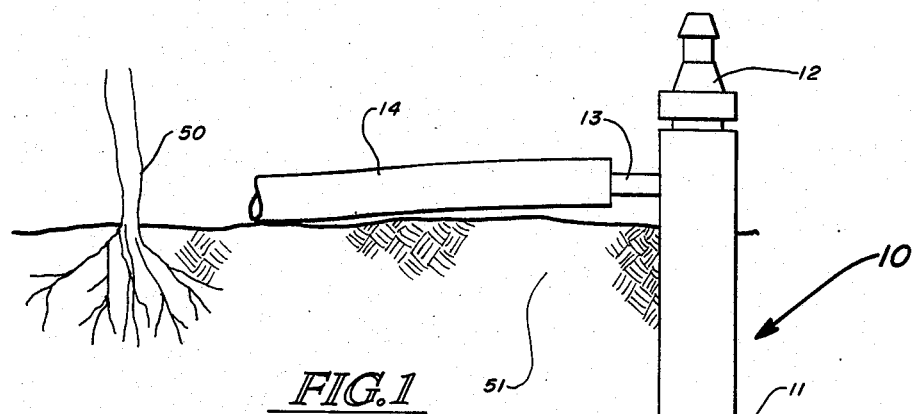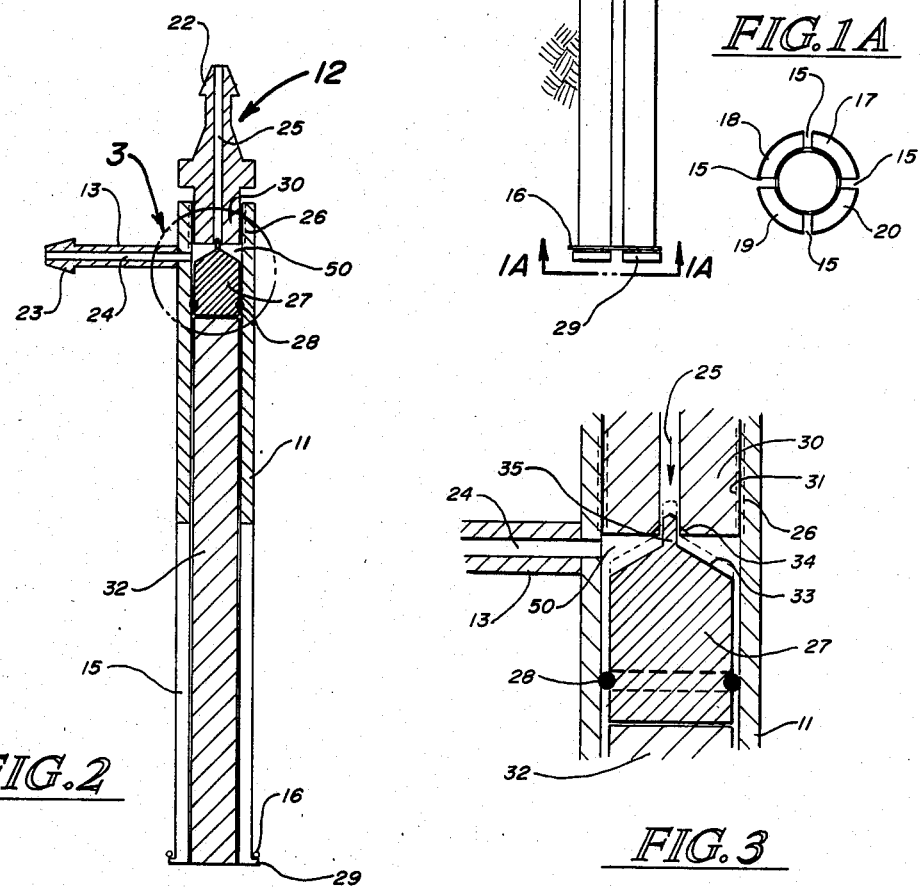

IRRIGATION DEVICE

BACKGROUND OF THE INVENTION

1. Field of the Invention

This invention relates generally to the area of watering devices for use in gardening and, more specifically, to automatic irrigation devices known as hygrostats, which include a valve and an expansible member designed to sense the moisture content of soil and to activate and deactivate the watering system accordingly.

2. Description of the Prior Art

Irrigation systems are normally designed to irrigate for a predetermined period and at regular intervals. However, such systems are unresponsive to variables which affect the moisture level in a given area of soil. Such variables include rainfall and higher or lower humidity levels, as well as rate of absorption by plants. As a result, most irrigation systems either overwater or underwater the soil, depending on weather variations, etc. To alleviate the problems of over- or underwatering, individual inventors have directed their efforts toward devices known as hygrostats or moisture-sensitive valves which sense the moisture level of the soil in a given area and allow water to pass therethrough whenever the moisture content falls below a given level. While some effort has been directed toward electrically monitoring the moisture level in the soil and actuating a valve electronically, the present invention is more directed toward moisture-responsive actuators which are mechanical in nature. Such mechanically actuated moisture-responsive actuators generally employ a moisture-sensitive element to open and close the valve. One such moisture-responsive element, wood, is well known and often used. With an increase in the moisture level in soil, the moisture-responsive element expands to shut off a valve, and with a decrease in the moisture level in the soil, it contracts, allowing watering. None of the prior art of which applicant is aware has taught a moisture-responsive actuator having the unique features and being of the unique construction of the present invention.

SUMMARY OF THE INVENTION

The present invention is an irrigation device which includes a substantially tubular housing with a valve, together with a moisture-responsive element which mechanically actuates the valve. When placed between a pressurized water source and an irrigation line to a plant to be watered or an area of soil the moisture level of which is to be monitored, the irrigation device will allow or restrict water flow on the basis of the moisture level in the soil at a given time.

One of the objects of the present invention is to provide a device which restricts flow of water to a given area to be irrigated when a predetermined level of moisture in the soil has been reached.

Another object of the present invention is to provide a rugged yet inexpensive and dependable irrigation device which reliably monitors and controls the moisture level in a given area of soil.

A further object of the present invention is to provide an irrigation device which monitors and controls the moisture level in soil and which is easily repaired or cleaned.

The foregoing objects, as well as other objects and benefits of the present invention, are made more apparent by the descriptions and claims which follow.

BRIEF DESCRIPTION OF THE DRAWINGS

FIG. 1 is a side view of the irrigation device 10 showing it in position in the ground and in place to monitor moisture level in the soil, and to deliver water to a plant.

FIG. 1A is a bottom view of the irrigation device 10 taken along lines 1A—1A of FIG. 1.

FIG. 2 is a cross-sectional view of the irrigation device 10.

FIG. 3 is an expanded cross-sectional view of the area of irrigation device 10 circled and noted as 3 in FIG. 2.

DESCRIPTION OF THE PREFERRED EMBODIMENT

FIG. 1 of the drawings shows irrigation device 10 in position in soil 51 to water the roots of a plant 50. In connecting irrigation device 10 to water plant 50, the operator connects an existing water source to connector 12. Water flows through connector 12, through housing 11, and into connector 13, through irrigation line 14 and to plant 50. Moisture from soil 51 enters housing 11 through slots 15, thereby exposing moisture-responsive element 32, shown in FIG. 2, to moisture from soil 51. As shown in FIG. 1A of the drawings, housing 11 has several slots 15 cut therein, leaving sections 17, 18, 19 and 20 of housing 11 intact.

FIG. 2 is a cross-sectional view of irrigation device 10 disclosing the valve arrangement and moisture-responsive element 32 in chamber 50 of housing 11. Moisture-responsive element 32 is generally composed of wood or any other acceptable material which expands in the presence of moisture and contracts when the moisture level is reduced. Moisture-responsive element 32 is shaped so as to fit the shape of the inside of housing 11. Moisture-responsive element 32 is held rigidly in position at the bottom end of housing 11 by pressure created by retaining ring 16. The sections 17, 18, 19 and 20 created as a result of slots 15 are sufficiently flexible to allow retaining ring 16 to exert the pressure required to hold moisture-responsive element 32 rigidly in place with respect to the bottom end of housing 11. Lip 29 is provided to prevent retaining ring 16 from sliding off the end of housing 11. Water enters irrigation device 10 at nipple 22 of connector 12, flowing through hole 25, at which point the water encounters the valve arrangement consisting of body section 30 of connector 12 and a needle valve 27, which is activated or deactivated by the expansion or contraction of moisture-responsive element 32. If the moisture content of soil 51 is low, moisture-responsive element 32 is not activated, needle valve 27 therefore does not inhibit water flow, and water flows from connector 12 into hole 24 of connector 13 and out through irrigation line 14. During the flow of water through irrigation device 10, leakage of water past needle valve 27 is prevented by a sealing o-ring 28.

FIG. 3 of the drawings is an expanded view of the encircled area of FIG. 2 referred to as 3. As shown here, body 30 of connector 12 threads into the end of housing 11 by means of threads 31 on body 30 of connector 12 and threads 26 on the interior of housing 11. Needle valve 27 is beveled at 33 and includes a needle 35. The diameter of needle 35 is such that it fits loosely into hole 25 of body 30 of connector 12. The solid lines of needle valve 27 show its position when moisture level of soil 51 is low, and the dashed lines represent its position when moisture-responsive element 32 is activated by increased moisture content. When moisture-responsive element 32 is actuated and needle valve 27 is pushed up toward body 30, needle 35 is pushed farther into hole 25 so that beveled area 33 of needle valve 27 ultimately contacts beveled area 34 of body 30, stopping the water flow from connector 12 to connector 13. As is shown in this view, needle valve 27 is not rigidly attached to moisture-responsive element 32, because it is anticipated that irrigation device 10 will be utilized with a pressurized water system, the pressure of the existing water supply opening the needle valve arrangement consisting of needle valve 27 and body 30 when moisture-responsive element 32 contracts. However, if a nonpressurized water supply or a water supply with very low pressure were to be utilized to supply irrigation water, needle valve 27 could be rigidly attached to the end of moisture-responsive element 32 where it comes into contact therewith.

Because moisture-responsive element 32 is held rigidly in place at the bottom end of housing 11, it is clear that, unless further precautions were taken, in an extremely rainy season needle valve 27 could be pushed up against body 30 so hard that breakage might occur. However, this possibility is minimized by the use of a needle valve 27 constructed of soft, flexible material such as rubber. If a rigid needle valve 27 is used, the problem may be resolved by the application of rubber or other flexible material to the end of moisture-responsive element 32 where it comes into contact with the bottom of needle valve 27. The use of such flexible materials eliminates the need for a spring at the bottom end of moisture-responsive element 32, as is used in many irrigation devices of this general type.

While the foregoing description of the invention has shown a preferred embodiment using specific terms, such description is provided for illustrative purposes only. It is applicant's intention that changes and variations may be made without departure from the spirit or scope of the following claims, and this disclosure is not intended to limit applicant's protection in any way.

I claim:

1. A moisture-responsive irrigation device, comprising:
    a housing constructed of substantially tubular hollow material having:
       a top end;
       a bottom end;
       a wall, and
       a slot cut through said wall extending from said bottom end of said housing to a point substantially midway between said top end and said bottom end of said housing;
    a valve positioned at said top end of said housing having an inlet and an outlet;
    a moisture-sensitive element positioned inside said housing and having a top end and a bottom end, oriented so that said bottom end of said moisture-sensitive element is positioned substantially at said bottom end of said housing, and said top end of said moisture-sensitive element is positioned near said top end of said housing in operative contact with said valve so that, as said moisture-sensitive element expands in response to increased moisture, it exerts pressure on said valve, closing said valve, and
    retaining means consisting substantially of a retaining ring positioned about and near said bottom end of said hosing which exerts pressure on said wall of said housing whereby said bottom end of said housing compresses, holding said bottom end of said moisture-sensitive element substantially rigidly with respect to said bottom end of said housing.

2. The invention of claim 1 wherein said valve consists substantially of:
    a connector attached to said top end of said housing, having a nipple for connection to a water line and a hole therethrough communicating said nipple with the inside of said housing, and
    a needle valve positioned inside said housing between said connector and said moisture-sensitive element, having a needle with a diameter substantially the same as the diameter of said hole in said connector extending toward said hole in said connector so that, when said moisture-sensitive element expands, said needle pushes into said hole of said connector, interrupting the flow of water through said valve.

3. The invention of claim 2 wherein said needle valve is constructed of flexible material to protect said valve from breakage if said moisture-sensitive element exerts excessive pressure thereon.

4. The invention of claim 2 wherein said valve includes sealing means consisting substantially of an o-ring extending around said needle valve between said needle valve and an inner surface of said wall of said housing.

* * * * *